United States Patent
Lin et al.

(10) Patent No.: US 10,921,891 B2
(45) Date of Patent: Feb. 16, 2021

(54) SYSTEMS AND METHODS FOR AUTHENTICATION CODE ENTRY IN TOUCH-SENSITIVE SCREEN ENABLED DEVICES

(71) Applicant: VeriFone, Inc., San Jose, CA (US)

(72) Inventors: Chih-Chang Lin, Taipei (TW); Chan He Lin, New Taipei (TW)

(73) Assignee: VeriFone, Inc., San Jose, CA (US)

( * ) Notice: Subject to any disclaimer, the term of this patent is extended or adjusted under 35 U.S.C. 154(b) by 14 days.

(21) Appl. No.: 15/933,862

(22) Filed: Mar. 23, 2018

(65) Prior Publication Data
US 2019/0294246 A1    Sep. 26, 2019

(51) Int. Cl.
*G06F 3/041* (2006.01)
*G06F 3/01* (2006.01)
*G06F 3/023* (2006.01)
*G06Q 20/40* (2012.01)
(Continued)

(52) U.S. Cl.
CPC ............ *G06F 3/016* (2013.01); *G06F 3/0233* (2013.01); *G06F 3/041* (2013.01); *G06F 21/36* (2013.01); *G06Q 20/206* (2013.01); *G06Q 20/4014* (2013.01); *G06F 2203/04808* (2013.01)

(58) Field of Classification Search
CPC .......... G06F 21/31; G06F 21/36; G06F 21/45; G06F 2203/04808; G06F 3/016; G06F 3/041; G06F 3/04883; G06F 3/04886; G06F 3/0233; G06F 3/04842; G06F 3/0488; G06F 3/0489; G06F 3/167; G06Q 20/20; G06Q 20/206; G06Q 20/4014
See application file for complete search history.

(56) References Cited

U.S. PATENT DOCUMENTS 5,589,855 A  *  12/1996  Blumstein ........... G06F 3/04847
                                                        235/379
6,509,847 B1     1/2003  Anderson
(Continued)

FOREIGN PATENT DOCUMENTS

EP          1079584       2/2001
EP          3121779       1/2017
WO     WO 2017/091558    6/2017

OTHER PUBLICATIONS

U.S. Appl. No. 15/918,013, filed Mar. 2018.
European Search Report, dated Apr. 4, 2019, from corresponding European Patent Application No. 19151122.

*Primary Examiner* — Ram A Mistry
(74) *Attorney, Agent, or Firm* — Greenberg Traurig LLP

(57) ABSTRACT

Systems and methods for authentication code entry in touch-sensitive screen enabled devices are disclosed. In one embodiment, a method for entering authentication value data to a data entry device that comprises at least one computer processor and a touch-sensitive screen may include: (1) the touch-sensitive screen sensing a control touch on the touch-sensitive screen; (2) the touch-sensitive screen sensing a release of the control touch from the touch-sensitive screen; (3) the at least one computer processor determining a number of first touches sensed by the touch-sensitive screen in a period between the sensing of the control touch and the sensing of the release of the control touch; and (4) the at least one computer processor using the number of first touches to represent a value in an authentication code.

19 Claims, 3 Drawing Sheets

(51) Int. Cl.
*G06F 21/36* (2013.01)
*G06Q 20/20* (2012.01)

(56) References Cited

U.S. PATENT DOCUMENTS

| | | | | |
|---|---|---|---|---|
| 7,593,000 | B1* | 9/2009 | Chin | G06F 3/04883 |
| | | | | 345/156 |
| 8,570,294 | B2* | 10/2013 | Adamson | G06F 3/04883 |
| | | | | 345/173 |
| 2011/0099513 | A1* | 4/2011 | Ameline | G06F 3/0488 |
| | | | | 715/790 |
| 2012/0126941 | A1 | 5/2012 | Coggill | |
| 2014/0223549 | A1* | 8/2014 | Quintanilla | G06F 21/31 |
| | | | | 726/19 |
| 2014/0324606 | A1 | 10/2014 | Fortuna et al. | |
| 2015/0161369 | A1* | 6/2015 | Weksler | G06F 21/32 |
| | | | | 726/19 |
| 2015/0220058 | A1 | 8/2015 | Mukhtarov et al. | |
| 2017/0054466 | A1 | 2/2017 | Flores et al. | |

* cited by examiner

SYSTEMS AND METHODS FOR AUTHENTICATION CODE ENTRY IN TOUCH-SENSITIVE SCREEN ENABLED DEVICES

BACKGROUND OF THE INVENTION

1. Field of the Invention

The present disclosure relates generally to input devices, and more particularly to systems and methods for authentication code entry in touch-sensitive screen enabled devices.

2. Description of the Related Art

Payment Acceptance Devices often use physical number pads to receive customer authentication information, such as Personal Identification Number (PIN) codes. With the advent of touch-sensitive screen technology, virtual keypads are sometimes used for PIN code entry. However, touch-sensitive screens do not have the traditional tactile clues of physical keypads that may help identify where to push for the PIN numbers, therefore increasing the possibility of making an error when entering one's PIN on a virtual keypad. Further, the lack of traditional tactile clues may require a visually impaired person to rely on the sales clerk or a third party to input their PIN for them. This, of course, is likely to compromise the security of a payment instrument, such as a credit or debit card.

SUMMARY OF THE INVENTION

Systems and methods for authentication code entry in touch-sensitive screen enabled devices are disclosed. In one embodiment, a method for entering authentication value data to a data entry device that comprises at least one computer processor and a touch-sensitive screen may include: (1) the touch-sensitive screen sensing a control touch on the touch-sensitive screen; (2) the touch-sensitive screen sensing a release of the control touch from the touch-sensitive screen; (3) the at least one computer processor determining a number of first touches sensed by the touch-sensitive screen in a period between the sensing of the control touch and the sensing of the release of the control touch; and (4) the at least one computer processor using the number of first touches to represent a value in an authentication code.

In one embodiment, at least two of the number of first touches may be sensed substantially simultaneously.

In one embodiment, at least one of the first touches may be a tap.

In one embodiment, at least one of the first touches may be a sensed contact with the touch-sensitive screen, an increase in pressure of the sensed contact on the touch-sensitive screen, and a decrease in pressure of the sensed contact on the touch-sensitive screen.

In one embodiment, at least one of the first touches includes a sensed contact with the touch-sensitive screen, an increase in contact area of the sensed contact on the touch-sensitive screen, and a decrease in contact area of the sensed contact on the touch-sensitive screen.

In one embodiment, the method may further include the touch-sensitive screen sensing a second control touch on the touch-sensitive screen; the touch-sensitive screen sensing a release of the second control touch from the touch-sensitive screen; the at least one computer processor determining a number of second touches sensed by the touch-sensitive screen in a period between the sensing of the second control touch and the sensing of the release of the second control touch; and the at least one computer processor using the number of second touches to represent a second value in the authentication code.

In another embodiment, a method for entering authentication value data to a data entry device that comprises at least one computer processor and a touch-sensitive screen may include: (1) the touch-sensitive screen sensing a plurality of contacts with the touch-sensitive screen; (2) the touch-sensitive screen sensing an entry gesture on the touch-sensitive screen; (3) the at least one computer processor determining a number of touches sensed by the touch-sensitive screen in a period between the sensing of the plurality of contacts with the touch-sensitive screen and the sensing of the entry gesture; and (4) the at least one computer processor using the number of touches to represent a value in an authentication code.

In one embodiment, the method may further include the at least one computer processor initiating entry in response to the sensed plurality of contacts.

In one embodiment, at least one of the touches may be a tap.

In one embodiment, at least one of the touches includes a sensed contact with the touch-sensitive screen, an increase in pressure of the sensed contact on the touch-sensitive screen, and a decrease in pressure of the sensed contact on the touch-sensitive screen.

In another embodiment, at least one of the touches includes a sensed contact with the touch-sensitive screen, an increase in contact area of the sensed contact on the touch-sensitive screen, and a decrease in contact area of the sensed contact on the touch-sensitive screen.

In one embodiment, the entry gesture may include a double tap.

In one embodiment, the entry gesture may be an absence of contact with the touch-sensitive screen.

According to another embodiment, a data entry device for receiving authentication code data may include a touch-sensitive screen; a memory; and at least one computer processor. The touch-sensitive screen may sense a control touch on the touch-sensitive screen and a release of the control touch from the touch-sensitive screen. The at least one computer processor may determine a number of first touches sensed by the touch-sensitive screen in a period between the sensing of the control touch and the sensing of the release of the control touch, and may use the number of first touches to represent a value in an authentication code.

In one embodiment, at least two of the number of first touches are sensed substantially simultaneously.

In one embodiment, at least one of the first touches is a tap.

In one embodiment, the touch-sensitive screen may further include a pressure-sensitive layer, and at least one of the first touches may include a sensed contact with the touch-sensitive screen, an increase in pressure of the sensed contact on the touch-sensitive screen, and a decrease in pressure of the sensed contact on the touch-sensitive screen.

In one embodiment, at least one of the first touches may include a sensed contact with the touch-sensitive screen, an increase in contact area of the sensed contact on the touch-sensitive screen, and a decrease in contact area of the sensed contact on the touch-sensitive screen.

In one embodiment, the data entry device may be a point of sale device.

In one embodiment, the data entry device may be an ATM.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

The disclosures of U.S. Provisional Patent Application Ser. No. 62/258,757 filed Nov. 23, 2015, U.S. patent application Ser. No. 15/918,013 field Mar. 12, 2018, and International Patent Application Publication No. PCT/US2016/63285 filed Nov. 22, 2016 are hereby incorporated, by reference, in their entireties.

Figure 1:
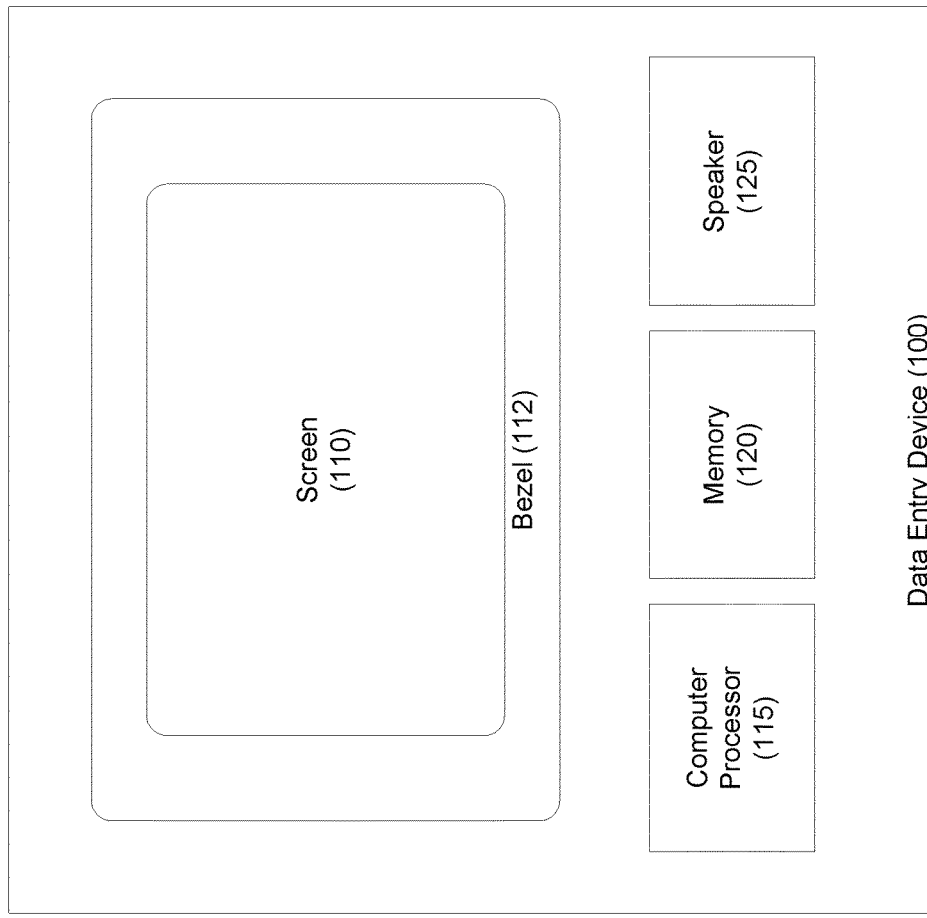
FIG. 1 depicts a touch-sensitive screen PIN entry device according to one embodiment.
Figure 2:
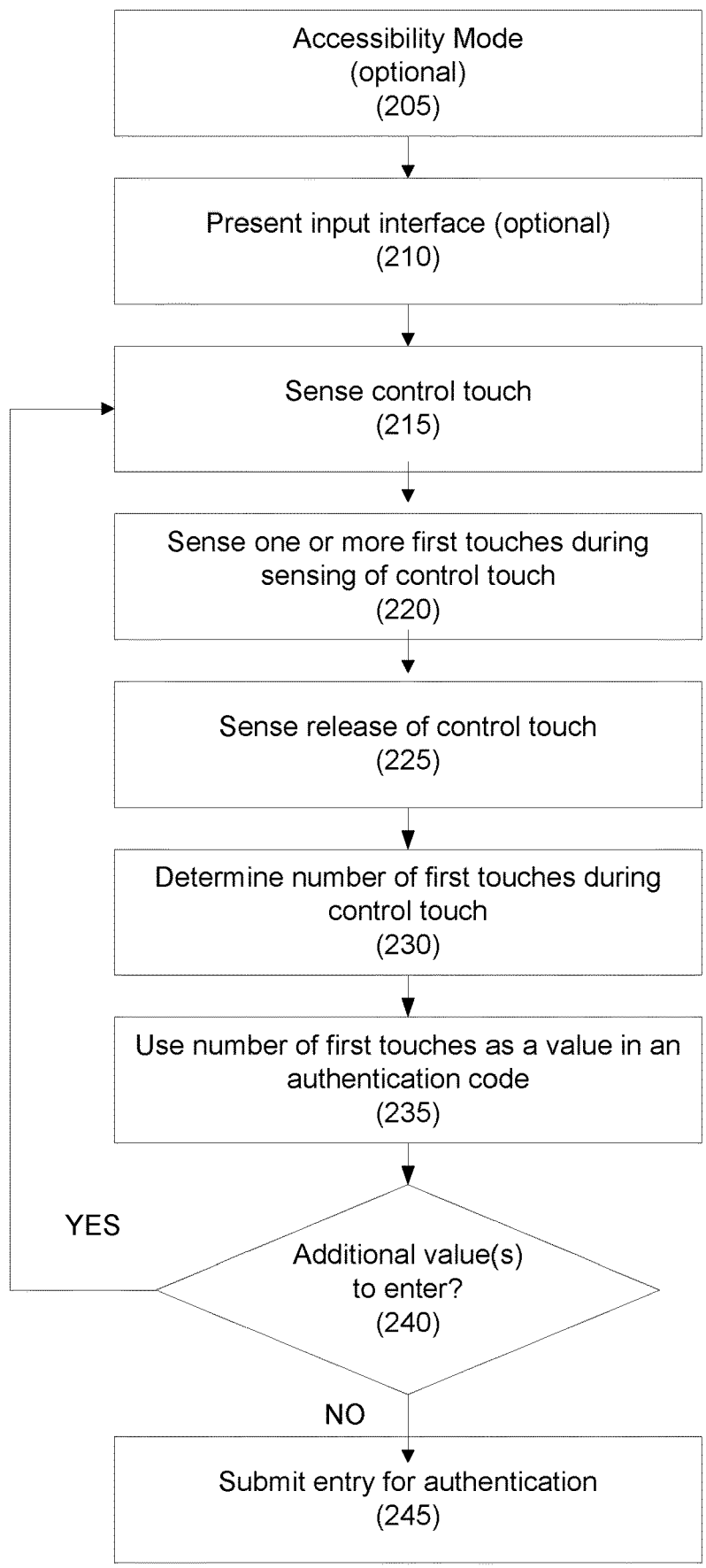
FIG. 2 depicts a method for entering authentication value data into a touch-sensitive screen enabled data entry device according to one embodiment.
Figure 3:
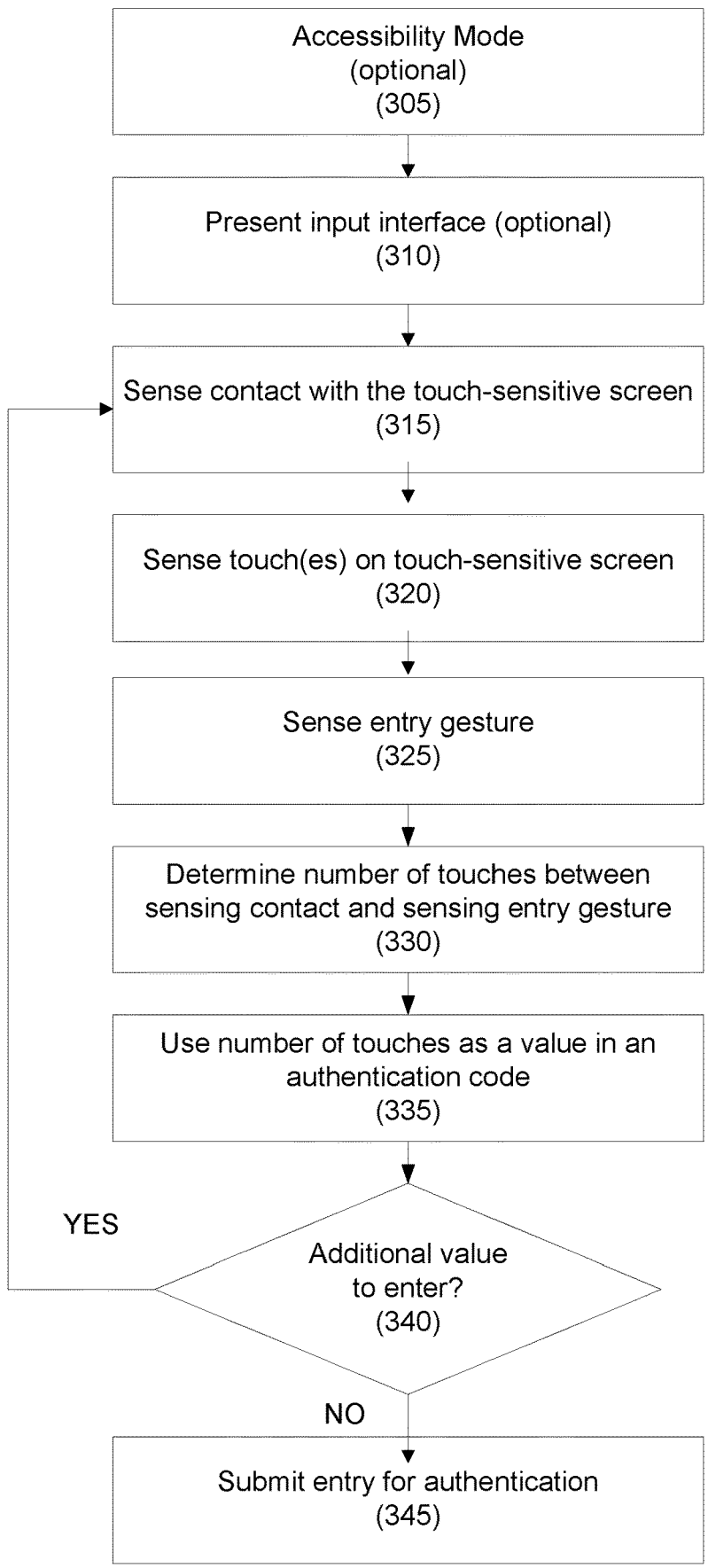
FIG. 3 depicts a method for entering authentication value data into a touch-sensitive screen enabled data entry device according to one embodiment.

Several embodiments of the present invention and their advantages may be understood by referring to FIGS. 1-3.

Embodiments are directed to touch-sensitive screen authentication code (e.g., a PIN) entry devices and methods. Although embodiments may be disclosed in the context of the entry of a PIN, it should be recognized that the entry of any authentication code, including letters, numbers, gestures, etc. is also contemplated and within the scope of this disclosure, and the use of the term PIN should be recognized to encompass this other data.

Referring to FIG. 1, a touch-sensitive screen data entry device is disclosed according to one embodiment. Data entry device 100 may include screen 110, computer processor 115, memory 120, and speaker 125. Data entry device 100 may interface with at least one network (not shown), such as communication networks, payment networks, etc. Other peripherals (e.g., input devices, displays, headphone jacks, Bluetooth interfaces, etc.) may be provided as necessary and/or desired.

In one embodiment, data entry device 110 may be a point of sale (POS) device.

In one embodiment, computer processor 115 may be any suitable processing machine that executes the instructions that may be stored in internal and/or external memory or memories to process data. It may include general purpose computer processors, specialized computer processors, integrated circuits, programmed microprocessors, micro-controllers, peripheral integrated circuit elements, a CSIC (Customer Specific Integrated Circuit), ASIC (Application Specific Integrated Circuit), other integrated circuits, digital signal processors, programmable logic devices such as a FPGA, PLD, PLA or PAL, or any other suitable device or arrangement of devices.

In one embodiment, screen 110 may be a touch-sensitive screen device, and may be sensitive to a single touch, or to multiple touches. In one embodiment, screen 110 may provide a user with tactile feedback, such as haptic feedback. Feedback may be provided in response to the user touching screen 110, in response to a user touching a virtual key on screen 110, at certain orientation points on screen 110, etc.

In one embodiment, touch-sensitive screen 110 may include a force film that allows for distinguishing between touches of differing pressure. An example of such is Apple, Inc.'s 3D Touch.

In another embodiment touch-sensitive screen 110 may sense an increase in pressure by sensing an increase in contact area with touch-sensitive screen 110. For example, as a user increases the pressure of a touch, a greater surface area of touch-sensitive screen 110 may be contacted as the user's finger flattens. The touch-sensitive screen may observe this increase is touch area and based on the increase in touch area may determine an increase is touch pressure. Similarly, a decrease in the touch area of a touch may be detected and identified as a decrease in pressure of a touch.

In another embodiment, the user may increase the surface area of the contact between the user's finger and touch-sensitive screen 110 by rolling, shifting, or repositioning the finger that is in contact with touch-sensitive screen 110.

In one embodiment, screen 110 may include a controller or other processor that may sense and process touches, including changes in touch pressures and/or touch areas, and release of touches, to the surface of screen 110. In one embodiment, as used herein, computer processor 115 may refer to such a microcontroller or processor. Further the functionality of sensing and processing touches and release of touches may be divided between a controller (or other processor) and computer processor 110.

In embodiments, processing of data sensed by screen 110 may be performed by computer processor 115 and/or a controller, computer processor, etc. that may control the operation of screen 110.

Referring to FIG. 2, a method of authentication code entry using a touch-sensitive screen device is disclosed according to one embodiment.

In one embodiment, in optional step 205, a user may request that the data entry device enter an accessibility mode, whereby data entry may be accomplished using an alternative method than the one that the data entry device usually uses. For example, this may allow for the selection of at least one of the embodiments disclosed here.

In one embodiment, the request may be made in any suitable manner, including by touch (e.g., a touch a specific area of the screen, multiple touches (e.g., 3) within a predetermined time period, etc.). In one embodiment, the data entry device may automatically enter accessibility mode based on a received identification and a user preference. For example, if the user's preference is to enter accessibility mode, the data entry device may enter accessibility mode whenever a transaction involving the user is initiated (e.g., in response to receipt of a card swipe, chip card, NFC transmission, user biometric, detection of a device registered to the user, etc.). For simplicity, in this embodiment, when accessibility mode is entered in step 205, a data entry method is automatically selected. However, a person of skill in the art will understand that in alternative embodiments, step 205 may include the selection of a data entry method from amongst two or more data entry methods.

In one embodiment, the data entry device may indicate that it is capable of entering accessibility mode to the user. In one embodiment, the data entry device may make a sound (e.g., a chime) at the beginning of the transaction, when the card is swiped or inserted, etc.

In one embodiment, accessibility mode may be manually selected by the user entered at any time during the transaction.

In one embodiment, during a first use, or as necessary and/or desired, the data entry device may enter a "learning mode" in which the user's handwriting, gestures, and characteristics thereof are learned and stored. In one embodiment, this data may be stored on the chip of a transaction card, or may be stored in, for example, the cloud.

In optional step 210, an entry interface may be presented.

In step 215, the touch-sensitive screen may sense a control touch from the user. In one embodiment, the user may provide control first touch by touching the touch-sensitive screen with, for example, one or more finger. The user may maintain the control touch (e.g., maintain contact with the touch-sensitive screen, maintain a constant pressure on the touch-sensitive screen, etc.) during entry process.

For example, a user may provide the control touch by touching the touch-sensitive screen with the user's index finger, and may maintain the contact with the touch-sensitive screen during the data entry process. In one embodiment, the user may also maintain a substantially consistent pressure on the touch-sensitive screen.

In one embodiment, the control touch may be provided at any portion of the touch-sensitive screen as is necessary and/or desired. In an alternative embodiment, a particular area of the screen may be identified as the location of the screen where the control touch may be made and maintained (e.g., by displaying an instruction, prompt, or interface or by providing an audible cue).

In step 220, during the sensing of the control touch (e.g., while user maintains the control touch with the touch-sensitive screen), the touch-sensitive screen may sense one or more first touches. In one embodiment, the first touches may be "taps" (i.e., contact and release), the application and release of additional pressure on the touch-sensitive screen, etc.

For example, the user may maintain the control touch by maintaining contact or pressure between the user's index finger and the touch-sensitive screen, and may provide the one or more first touches by using the user's middle finger to "tap" or apply/release pressure to the touch-sensitive screen.

In another embodiment, the user may use different hands to provide the control touch and the first touch(es).

In one embodiment, the first touches may comprise an initial touch of the screen, and the sensing of the application of additional pressure of the initial contact. The touch-sensitive screen may sense an increase in touch pressure by sensing an increase in a contact area between the touch and the touch-sensitive screen, and may sense a subsequent release of the additional pressure by sensing a decrease in the contact area between the touch and the touch-sensitive screen. In one embodiment, following the release of the additional pressure, the sensed contact area may be substantially the same as the sensed contact area before the application of the additional pressure. The sensing of an initial touch and the subsequent increase in pressure and the decrease in pressure may be registered in the same manner as a tap.

In another embodiment, the touch-sensitive screen may comprise a force sensing film that can detect increases in the amount of force applied by a touch which may be used to recognize a subsequent increase and decrease in touch pressure as a tap.

In another embodiment, the additional contact may be created by the user "rolling" his or her finger on the touch-sensitive screen to create the addition contact area between the finger and the touch-sensitive screen.

In one embodiment, the first touch(es) may be provided at any portion or location of the touch-sensitive screen as is necessary and/or desired.

In one embodiment, multiple first touches may be received simultaneously, or substantially simultaneously. For example, the user may use the user's middle and ring fingers to provide first touches to the touch-sensitive screen.

In one embodiment, a plurality of first touches may be received serially (e.g., with the same finger or a different finger, one after the other, alternating fingers, etc.). In another embodiment, a plurality of first touches may be received as a combination of simultaneous, or substantially simultaneous, and serial touches. For example, a sequence of first touches comprising a tap of the middle finger may be followed by a simultaneous tap of the middle and ring finger. This "pattern" may be received, and used, as additional authentication information.

In one embodiment, the first touches may be sensed as a combination of taps and increases/decreases in pressure. In one embodiment, the manner in which the first touches are received (e.g., the order of taps and increases/decreases in pressure) may further be used to authenticate the user. For example, the user may enter the number "4" as two taps and two touches that increase/decrease pressure. This manner of entering "4" would differ from four taps. Similarly, the user may pause between the second and third tap, and the entry of the pause may be part of the authentication process.

In addition, other data (e.g., the location of the first touches, the timing of the first touches, the strength (e.g., pressure) of the first touches, the duration of the first touches, etc.) may be used to authenticate the user. For example, in entering the number "4", the user may apply greater pressure for the first and second taps than with the second and fourth taps. As another example, the user may enter a first value at the top portion of the touch-sensitive screen, and another at a lower portion of the touch-sensitive screen.

Any other suitable manner of entering data, and combinations thereof, may be used in the authentication as is necessary and/or desired.

In one embodiment, a value of zero may be entered as ten first touches, or it may be entered by not entering any first touches during the duration of the control touch.

In step 225, the touch-sensitive screen may sense the release of the control touch. In one embodiment, the touch-sensitive screen may sense a discontinuity in the contact of the control touch with the touch-sensitive screen, a decrease in pressure of the control touch, etc. In one embodiment, sensing the release of the control touch indicates the completion of a value entry.

In one embodiment, an optional step following the sensing of the release of the control touch may be used to confirm the intended release of the control touch. The confirmation may be provided by sensing a subsequent gesture, such as a double tap, swipe, character trace (e.g., checkmark), etc., touching a virtual button on the touch-sensitive screen, which indicates the completion of the value entry, touching a physical button, etc. In another embodiment, a discard gesture may be used to discard the one or more second touches and restart the entry process. For example, a gesture such as an "X", a slash, etc. or a virtual key touch (e.g., a virtual key labelled "delete," "cancel," "X," etc.) that may be displayed on the touch-sensitive screen may be used. If a gesture indicating that the one or more first touches is(are) to be discarded, then the user may repeat steps 215 to 225 to re-enter a value. In a further embodiment, either a confirmation or restart gesture may be used to end the sequence.

In step 230, the computer processor may determine the number of first touches received during the duration of the control touch.

In step 235, the computer processor may use the number of first touches to identify a value in an authentication code, such as a PIN.

In one embodiment, the device may provide feedback to inform the user whether the number of first touches was successfully identified. For example, if the number of first touches was successfully identified, the device may indicate such by providing a positive sound (e.g., a beep, chime, etc.), a visual indicator (e.g., an asterisk in the location of the value in the authentication code, a checkmark, a smiley face, etc.). If the number of first touches was not successfully identified, the device may indicate such by providing a negative sound (e.g., a buzzer), a visual indicator (e.g., an "X" in the location of the value in the authentication code, a frowning face, etc.).

In one embodiment, feedback may be provided to indicate how many values in the authentication code have been received. For example, with each received value, an asterisk may be used as a placeholder, so that the user know which value in the authentication code is being entered (i.e., an asterisk is displayed for each value entered such that four asterisks will be displayed when the fourth value is entered). Other types of feedback may be used as is necessary and/or desired.

In step 240, if one or more additional values are required (e.g., a four value PIN), the user may repeat steps 215-235 until all values are input. In one embodiment, a gesture (e.g., a checkmark, swipe up, double tap, removal of all touches with touch-sensitive screen for a predetermined time, etc.) may be used to confirm the entry of all values of the authentication code.

If all values have been received, in step 240, the authentication code may be validated. In one embodiment, in step 245, the authentication code may be submitted to an authentication authority (e.g., an issuer) for approval. The authentication code may be encrypted before being transmitted.

In one embodiment, the data entry device may verify the authentication code against data stored on the transaction card (e.g., on the chip embedded in the card or on one of the tracks on a magnetic stripe), on a backend server, in the cloud, etc.

In one embodiment, transaction data may also be provided to the authenticating authority, either encrypted or unencrypted.

As discussed above, if the authentication code is incorrect, the process may be repeated, and if unsuccessful, the user may receive training.

Referring to FIG. 3, a method of authentication code entry using a touch-sensitive screen device is disclosed according to another embodiment.

In one embodiment, in optional steps 305 and 310, a user may request that the data entry device enter an accessibility mode and an entry interface may be presented, respectively. These steps may be similar to steps 205 and 210, above.

In step 315, the touch-sensitive screen may sense a contact from the user. In one embodiment, the contact may be used to initiate the entry process.

In one embodiment, the contact may include a single touch, multiple touches, etc. The user may maintain the contact, or may release the contact.

In step 320, the touch-sensitive screen may sense one or more touches. In one embodiment, if the contact was released, the touches may be taps (individual or multiple). If the contact was maintained, the touches may be increases/decreases in pressure between one or more touch in the contact and the touch-sensitive screen.

In step 325, the touch-sensitive screen may sense an entry gesture. In one embodiment, the entry gesture may be a double tap, swipe, character trace (e.g., checkmark), etc., touching a virtual button on the touch-sensitive screen, touching a physical button, etc. In one embodiment, the entry gesture may be an absence of contact with the touch-sensitive screen for a certain amount of time (e.g., 3 seconds).

In one embodiment, a discard gesture, as described above, may be used to discard the one or more second touches and restart the entry process.

In step 330, the computer processor may determine the number of touches (e.g., taps, increases/decreases in pressure or contact area, etc.) between the sensing of the contact and the sensing of the entry gesture.

In step 335, the computer processor may use the number of touches to identify a value in an authentication code, such as a PIN. As discussed above, feedback may be provided to indicate successful and/or unsuccessful identification of the value, the number of values received, etc.

In step 340, if one or more additional values are required (e.g., a four value PIN), the user may repeat steps 315-335 until all values are input. This may be similar to step 240, above.

If all values have been received, in step 340, the authentication code may be validated, and in step 245, the authentication code may be submitted to an authentication authority (e.g., an issuer) for approval. These steps may be similar to steps 240 and 245, above.

It will be appreciated by persons skilled in the art that the present invention is not limited by what has been particularly shown and described hereinabove. Rather the scope of the present invention includes both combinations and sub-combinations of features described hereinabove and variations and modifications thereof which are not in the prior art. It should further be recognized that these embodiments are not exclusive to each other.

It will be readily understood by those persons skilled in the art that the embodiments disclosed here are susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for entering a multi-digit authentication code to a data entry device that comprises at least one computer processor and a touch-sensitive screen, comprising:

the touch-sensitive screen sensing a control touch on the touch-sensitive screen;

the touch-sensitive screen sensing at least one contact with the touch-sensitive screen while the touch-sensitive screen senses the control touch;

the touch-sensitive screen sensing a release of the control touch from the touch-sensitive screen;

the touch-sensitive screen sensing a confirmation touch following the sensing of the release of the control touch;

the at least one computer processor determining a number of times the touch-sensitive screen is contacted in a period between the sensing of the control touch and the sensing of the release of the control touch in response to the confirmation touch; and the at least one computer processor using the number of times the touch-sensitive screen is contacted as a digit in a multi-digit authentication code associated with a financial account.

2. The method of claim 1, wherein at least two contacts are sensed substantially simultaneously.

3. The method of claim 1, wherein at least one of the contacts comprises a tap.

4. The method of claim 1, wherein at least one of the contacts comprises a sensed contact with the touch-sensitive screen, an increase in pressure of the sensed contact on the touch-sensitive screen, and a decrease in pressure of the sensed contact on the touch-sensitive screen.

5. The method of claim 1, wherein at least one of the contacts comprises a sensed contact with the touch-sensitive screen, an increase in contact area of the sensed contact on the touch-sensitive screen, and a decrease in contact area of the sensed contact on the touch-sensitive screen.

6. The method of claim 1, further comprising:

the touch-sensitive screen sensing a second control touch on the touch-sensitive screen;

the touch-sensitive screen sensing a release of the second control touch from the touch-sensitive screen;

the at least one computer processor determining a second number of times the touch-sensitive screen is contacted in a period between the sensing of the second control touch and the sensing of the release of the second control touch; and the at least one computer processor using the second number of times the touch-sensitive screen is contacted as a second digit in the multi-digit authentication code.

7. A data entry device for receiving a multi-digit authentication code, comprising:

a touch-sensitive screen;
a memory; and
at least one computer processor;
wherein:
the touch-sensitive screen senses a control touch on the touch-sensitive screen;
the touch-sensitive screen senses at least one contact with the touch-sensitive screen while the touch-sensitive screen senses the control touch;
the touch-sensitive screen senses a release of the control touch from the touch-sensitive screen;
the touch-sensitive screen senses a confirmation touch following the sensing of the release of the control touch;
the at least one computer processor determines a number of times the touch-sensitive screen is contacted in a period between the sensing of the control touch and the sensing of the release of the control touch in response to the confirmation touch; and
the at least one computer processor uses the number of times the touch-sensitive screen is contacted as a digit in a multi-digit authentication code associated with a financial account.

8. The system of claim 7, wherein at least two contacts are sensed substantially simultaneously.

9. The system of claim 7, wherein at least one of the contacts comprises a tap.

10. The system of claim 7, wherein the touch-sensitive screen further comprises a pressure-sensitive layer, and
wherein at least one of the contacts comprises a sensed contact with the touch-sensitive screen, an increase in pressure of the sensed contact on the touch-sensitive screen, and a decrease in pressure of the sensed contact on the touch-sensitive screen.

11. The system of claim 7, wherein at least one of the contacts comprises a sensed contact with the touch-sensitive screen, an increase in contact area of the sensed contact on the touch-sensitive screen, and a decrease in contact area of the sensed contact on the touch-sensitive screen.

12. The system of claim 7, wherein the data entry device comprises a point of sale device.

13. The system of claim 7, wherein the data entry device comprises an ATM.

14. The method of claim 1, further comprising: A method for entering a multi-digit authentication code to a data entry device that comprises at least one computer processor and a touch-sensitive screen, comprising:

the touch-sensitive screen sensing a control touch on the touch-sensitive screen;
the touch-sensitive screen sensing at least one contact with the touch-sensitive screen while the touch-sensitive screen senses the control touch;
the touch-sensitive screen sensing a release of the control touch from the touch-sensitive screen;
a physical button on the data entry device receiving a confirmation touch following the sensing of the release of the control touch, wherein the at least one computer processor determines the number of times the touch-sensitive screen is contacted in the period between the sensing of the control touch and the sensing of the release of the control touch;
the at least one computer processor determining a number of times the touch-sensitive screen is contacted in a period between the sensing of the control touch and the sensing of the release of the control touch in response to the confirmation touch; and
the at least one computer processor using the number of times the touch-sensitive screen is contacted as a digit in a multi-digit authentication code associated with a financial account.

15. The method of claim 14, wherein at least one of the contacts comprises a sensed contact with the touch-sensitive screen, an increase in pressure of the sensed contact on the touch-sensitive screen, and a decrease in pressure of the sensed contact on the touch-sensitive screen.

16. The method of claim 14, wherein at least one of the contacts comprises a sensed contact with the touch-sensitive screen, an increase in contact area of the sensed contact on the touch-sensitive screen, and a decrease in contact area of the sensed contact on the touch-sensitive screen.

17. The system of claim 7, further comprising:

A data entry device for receiving a multi-digit authentication code, comprising:

a touch-sensitive screen;
a memory,
a physical button on the data entry device; and
at least one computer processor;
wherein:
the touch-sensitive screen senses a control touch on the touch-sensitive screen;
the touch-sensitive screen senses at least one contact with the touch-sensitive screen while the touch-sensitive screen senses the control touch;
the touch-sensitive screen senses a release of the control touch from the touch-sensitive screen;
wherein the physical button receives a confirmation touch following the sensing of the release of the control touch, and the at least one computer processor determines the number of times the touch-sensitive screen is contacted in the period between the sensing of the control touch and the sensing of the release of the control touch;
the at least one computer processor determines a number of times the touch-sensitive screen is contacted in a period between the sensing of the control touch and the sensing of the release of the control touch in response to the confirmation touch; and
the at least one computer processor uses the number of times the touch-sensitive screen is contacted as a digit in a multi-digit authentication code associated with a financial account.

18. The system of claim 17, wherein the touch-sensitive screen further comprises a pressure-sensitive layer, and
wherein at least one of the contacts comprises a sensed contact with the touch-sensitive screen, an increase in pressure of the sensed contact on the touch-sensitive screen, and a decrease in pressure of the sensed contact on the touch-sensitive screen.

19. The system of claim 17, wherein at least one of the contacts comprises a sensed contact with the touch-sensitive screen, an increase in contact area of the sensed contact on the touch-sensitive screen, and a decrease in contact area of the sensed contact on the touch-sensitive screen.

* * * * *